US010602106B2

(12) United States Patent
Naganuma

(10) Patent No.: US 10,602,106 B2
(45) Date of Patent: Mar. 24, 2020

(54) INFORMATION PROCESSING APPARATUS, INFORMATION PROCESSING METHOD, AND PROGRAM

(71) Applicant: SONY CORPORATION, Tokyo (JP)

(72) Inventor: Hiromasa Naganuma, Chiba (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/240,315

(22) Filed: Jan. 4, 2019

(65) Prior Publication Data
US 2019/0141303 A1  May 9, 2019

Related U.S. Application Data

(63) Continuation of application No. 15/571,592, filed as application No. PCT/JP2016/068754 on Jun. 24, 2016, now Pat. No. 10,218,949.

(30) Foreign Application Priority Data

Jul. 8, 2015  (JP) .................. 2015-136728

(51) Int. Cl.
H04N 9/31  (2006.01)
(52) U.S. Cl.
CPC ............. *H04N 9/3182* (2013.01); *H04N 9/31* (2013.01); *H04N 9/3185* (2013.01); *H04N 9/3194* (2013.01)
(58) Field of Classification Search
CPC .... G03B 21/005; G03B 21/28; G03B 21/147; G03B 21/208; G03B 21/2053; H04N 9/3182; H04N 9/31852; H04N 9/3194; H04N 9/3185
See application file for complete search history.

(56) References Cited

U.S. PATENT DOCUMENTS

| 6,793,350 B1 | 9/2004 | Raskar et al. |
| 2004/0141157 A1 | 7/2004 | Ramachandran et al. |
| 2004/0239888 A1 | 12/2004 | Kobayashi |
| 2005/0105057 A1 | 5/2005 | Matsuda et al. |

(Continued)

FOREIGN PATENT DOCUMENTS

| CN | 1890987 A | 1/2007 |
| JP | 2003-323610 A | 11/2003 |

(Continued)

OTHER PUBLICATIONS

Sep. 27, 2019, Chinese Office Action issue for related CN Application No. 201680039021.1.

*Primary Examiner* — Sultan Chowdhury
(74) *Attorney, Agent, or Firm* — Paratus Law Group, PLLC

(57) ABSTRACT

There is provided an information processing apparatus, an information processing method, and a program for reducing any drop in the accuracy of color correction, the information processing apparatus using a captured image captured by a calibrated imaging section imaging a projected image projected to a projection plane by a calibrated projection section in order to set color correction information as the information for correcting a color of each pixel of the projection section. This technology may be applied to electronic equipment having the functions of both a projector and a camera, or to a computer for controlling such electronic equipment.

26 Claims, 9 Drawing Sheets

(56) References Cited

U.S. PATENT DOCUMENTS

| | | | |
|---|---|---|---|
| 2007/0110304 A1 | 5/2007 | Tsukada | |
| 2008/0013057 A1* | 1/2008 | Bullock | G09G 3/002 353/121 |
| 2009/0066916 A1* | 3/2009 | Brown | G03B 21/28 353/31 |
| 2015/0215568 A1* | 7/2015 | Karasawa | H04N 9/3179 348/745 |
| 2015/0268537 A1* | 9/2015 | Kinebuchi | G03B 21/142 353/97 |

FOREIGN PATENT DOCUMENTS

| | | |
|---|---|---|
| JP | 2003-333611 A | 11/2003 |
| JP | 2007-304284 A | 11/2007 |
| JP | 2008-294961 A | 12/2008 |
| WO | WO 2005/057941 A1 | 6/2005 |

* cited by examiner

INFORMATION PROCESSING APPARATUS, INFORMATION PROCESSING METHOD, AND PROGRAM

CROSS REFERENCE TO PRIOR APPLICATION

This application is a continuation of U.S. patent application Ser. No. 15/571,592 (filed on Nov. 3, 2017), which is a National Stage Patent Application of PCT International Patent Application No. PCT/JP2016/068754 (filed on Jun. 24, 2016) under 35 U.S.C. § 371, which claims priority to Japanese Patent Application No. 2015-136728 (filed on Jul. 8, 2015), which are all hereby incorporated by reference in their entirety.

TECHNICAL FIELD

The present technology relates to an information processing apparatus, an information processing method, and a program. More particularly, the technology relates to an information processing apparatus, an information processing method, and a program for reducing any drop in the accuracy of color correction.

BACKGROUND ART

In the past, diverse techniques have been devised as a method for correcting the colors of an image projected by a projector. For example, a proposal was made of a method for correcting the color components of an input image using the spectral reflectance of the plane of projection or the information about the colors under a light source (e.g., see PTL 1). Also, a proposal was made of a method for color correction involving conversion of spectroscopy data to XYZ space in RGB components while correction information is being generated (e.g., see PTL 2).

CITATION LIST

Patent Literature

[PTL 1]
JP 2003-333611A
[PTL 2]
JP 2003-323610A

SUMMARY

Technical Problem

The proposed methods above are characterized by uniformly correcting the colors of an entire projected image. If the image is projected under complicated conditions involving projection onto a patterned or uneven projection plane for example, the accuracy of color correction of the projected image could be reduced and the imaging quality of the projected image could be lessened.

The present technology has been proposed in view of the above circumstances. An object of the technology is therefore to reduce any drop in the accuracy of color correction.

Solution to Problem

An information processing apparatus according to the present technology includes a color correction information setting section configured to use a captured image captured by a calibrated imaging section imaging a projected image projected to a projection plane by a calibrated projection section in order to set color correction information as the information for correcting a color of each pixel of the projection section.

Based on the projected image and the captured image, the color correction information setting section may obtain, for each pixel of the projection section, environment information as the information indicative of an effect on the color attributable to the projected image being projected onto the projection plane, the color correction information setting section further setting the color correction information using the environment information for each pixel of the projection section.

Based on a captured image captured of the projection plane to which the projected image has yet to be projected, the color correction information setting section may further obtain an illumination component of the projection plane for each pixel of the projection section. The color correction information setting section may also obtain a gain amount of the color correction information from the projected image in white for each pixel of the projection section. The color correction information setting section may set the color correction information using the illumination component, the gain amount, and the environment information for each pixel of the projection section.

The information processing apparatus may further include an adjustment section configured to adjust, for each pixel of the projection section, a projection level of the projection section projecting the projected image on the basis of a pixel value of each pixel of the captured image. The color correction information setting section may set the color correction information using the projected image projected by the projection section of which the projection level for each pixel is adjusted by the adjustment section.

The adjustment section may adjust the projection level for each pixel of the projection section in such a manner that the pixel value of each pixel of the captured image converges on a target value for each pixel.

The adjustment section may adjust the projection level for each pixel of the projection section in such a manner that the pixel value converges on a target value for the entire projected image.

The information processing apparatus may further include an initial value setting section configured to set an initial value of the projection level for each pixel of the projection section based on the pixel value of each pixel of the captured image and on a correspondence relation between each pixel of the projection section and each pixel of the imaging section. The adjustment section may adjust the initial value of the projection level set by the initial value setting section for each pixel of the projection section.

The information processing apparatus may further include a correspondence relation setting section configured to obtain the correspondence relation between each pixel of the projection section and each pixel of the imaging section based on the projected image and on the captured image. The initial value setting section may set the initial value of the projection level for each pixel of the projection section based on the pixel value of each pixel of the captured image and on the correspondence relation set by the correspondence relation setting section.

The initial value setting section may set the initial value of the projection level for each pixel of the projection section based on depth information and normal line information about the projection plane.

The information processing apparatus may further include a depth/normal line information setting section configured to set the depth information and the normal line information. The initial value setting section may set the initial value of the projection level for each pixel of the projection section based on the depth information and the normal line information set by the depth/normal line setting section.

The initial value setting section may further set the initial value of the projection level for each pixel of the projection section based on information about reflectance corresponding to an incidence angle of the projected image relative to the projection plane.

The information processing apparatus may further include a reflectance information setting section configured to set information about the reflectance. The initial value setting section may set the initial value of the projection level for each pixel of the projection section based on the information about the reflectance set by the reflectance information setting section.

The color correction information setting section may set the color correction information for each of multiple projection imaging apparatuses each including the projection section and the imaging section.

The adjustment section may set as a target value the smallest of luminance values, observed by an observer, of projected images projected to the projection plane by the projection sections of all projection imaging apparatuses, the adjustment section further adjusting the projection level for each pixel of the projection sections in such a manner that the luminance values converge on the target value.

If the difference in angle between each of the projection imaging apparatuses on the one hand and the projection plane on the other hand is larger than a predetermined threshold value, the color correction information setting section may adjust the color correction information in accordance with the angle formed between the projection imaging apparatus and the projection plane.

The information processing apparatus may further include an acquisition section configured to acquire information about the projected image and information about the captured image from a projection imaging apparatus having the projection section and the imaging section. The color correction information setting section may set the color correction information based on the information about the projected image and the information about the captured image acquired by the acquisition section.

The information processing apparatus may further include the projection section and the imaging section.

The information processing apparatus may further include an acquisition section configured to acquire information about the projected image and information about the captured image from another information processing apparatus having the projection section and the imaging section. The color correction information setting section may set the color correction information based on the information about the projected image projected by the projection section of the own information processing apparatus, on the information about the captured image captured by the imaging section of the own information processing apparatus, on the information about the projected image projected by the projection section of the other information processing apparatus and acquired by the acquisition section, and on the information about the captured image captured by the imaging section of the other information processing apparatus and acquired by the acquisition section.

An information processing method according to the present technology includes using a captured image captured by a calibrated imaging section imaging a projected image projected to a projection plane by a calibrated projection section in order to set color correction information as the information for correcting a color of each pixel of the projection section.

A program according to the present technology causes a computer to function as a color correction information setting section configured to use a captured image captured by a calibrated imaging section imaging a projected image projected to a projection plane by a calibrated projection section in order to set color correction information as the information for correcting a color of each pixel of the projection section.

According to the information processing apparatus, information processing method, and program embodying the present technology as outlined above, a captured image captured by a calibrated imaging section imaging a projected image projected to a projection plane by a calibrated projection section is used to set color correction information as the information for correcting a color of each pixel of the projection section.

Advantageous Effects of Invention

According to the present technology, it is possible to process information. Also according to this technology, it is possible to reduce any drop in the accuracy of color correction.

DESCRIPTION OF EMBODIMENTS

Described below are the preferred modes for implementing the present technology (called the embodiments hereunder). The description will be given under the following headings:

1. First embodiment (projection imaging apparatus)
2. Second embodiment (projection imaging system)
3. Third embodiment (applications)

1. First Embodiment

Projection Imaging Apparatus

Figure 1:
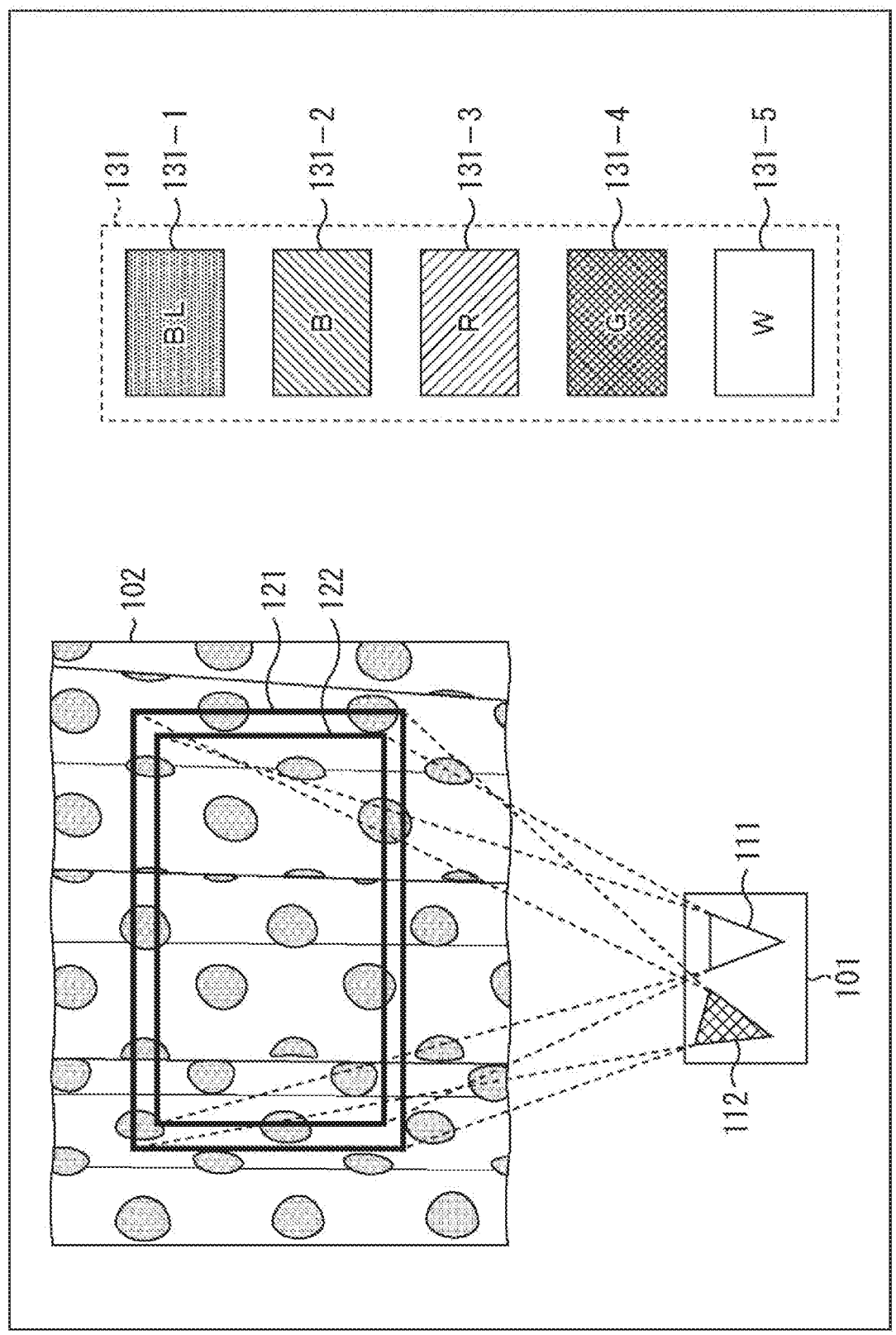
FIG. 1 is a schematic diagram explanatory of how projections are typically made.

FIG. 1 depicts a typical configuration of a projection imaging apparatus as one embodiment of an information processing apparatus to which the present technology is applied.

A projection imaging apparatus 101 depicted in FIG. 1 includes a projection section 111 that projects an image to a projection plane 102. The projection section 111 performs processes related to the projection of images. For example, the projection section 111 emits projection light to project an image of supplied image data to outside of the projection imaging apparatus 101 (e.g., to the projection plane 102). That is, the projection section 111 implements the projection function. The light source of the projection section 111 may be of any type, such as a light emitting diode (LED) or a xenon light source. Alternatively, the projection section 111 may emit a laser beam as the projection light. The projection section 111 may include an optical system made up of multiple lenses and a diaphragm to control the focal point distance, exposure, projecting direction, and projection field angle of the projection light.

The projection imaging apparatus 101 further includes an imaging section 112 that obtains a captured image by imaging the projection plane 102. The imaging section 112 incorporates an image sensor that generates the captured image by imaging a target object outside the apparatus and photoelectrically converting incident light therefrom. That is, the imaging section 112 implements the imaging function (sensor function). The image sensor incorporated in the imaging section 112 may be of any type, such as a complementary metal oxide semiconductor (CMOS) image sensor using CMOSs, a charge coupled device (CCD) image sensor using a CCD, or some other suitable image sensor.

As depicted in FIG. 1, an imaging range 122 of the imaging section 112 on the projection plane 102 embraces a projection range 121 of the projection section 111 on that projection plane 102. That means a captured image obtained by the imaging section 112 includes a projected image formed on the projection plane 102 by the projection section 111. The projection imaging apparatus 101 uses the captured image (i.e., what is projected to the projection plane 102) to correct the colors of the image projected by the projection section 111, thereby lessening any distortion of the projected image on the projection plane 102.

The image projected by the projection imaging apparatus 101 may be a moving image or a still image. The captured image obtained by the projection imaging apparatus 101 may be a moving image or a still image. The projection imaging apparatus 101 may be equipped with speakers, for example, to output sound. For example, the projection imaging apparatus 101 may output sound (e.g., background music (BGM)) in synchronism with a projected image or may output an operation confirmation sound (e.g., a beep or a message).

The projection plane 102 is a plane on which the projection imaging apparatus 101 projects images. The projection plane 102 may be a flat surface, a curved surface, a partially or entirely uneven surface, or a surface made up of multiple planes. The projection plane 102 may be of any color or colors or may have a pattern or a design.

In the example of FIG. 1, the projection plane 102 is formed by a curtain with a polka-dot pattern. That is, the projection plane 102 is constituted by an aggregate of diverse curved surfaces. The polka-dot pattern is deformed in keeping with the curvature of the curtain, so that the projection plane 102 has a more complicated pattern.

The projection plane 102 may be formed on any substance. For example, the projection plane 102 may be formed on a planar body such as a screen or a wall surface. Alternatively, the projection plane 102 may be formed on a space structure. For example, the projection plane 102 may be provided on a wall surface of a building, of a station building, or of a castle; on a natural object such as rock; on an artificial object such as a signboard or a statue; on furniture such as a wardrobe, a chair, or a desk; or on a living object such as a person, an animal, or a plant. As another alternative, the projection plane 102 may be formed on multiple surfaces such as walls, floors, or ceilings of a room space.

The projection plane 102 may also be formed on a solid object, a liquid, or a body of gas. For example, the projection plane 102 may be formed on the water surface of a pond or a pool, on the current water surface of a waterfall or a fountain, or on a gaseous body such as a fog or fumes. Also, the projection plane 102 may be in motion, deformed, or discolored. Furthermore, the projection plane 102 may be formed on multiple objects such as an aggregate of room walls, furniture, and people; of multiple building; or of castle walls and a fountain.

Color Correction

There is a possibility that the shape and colors of the projection plane 102 may affect the luminance and colors of the image projected to the projection plane 102, reducing the imaging quality of the projected image. This has prompted the idea of correcting the colors of the projected image. For example, the projection section 11 projects a sensing pattern 131 as a predetermined test pattern. The imaging section 112 captures a projected image of the sensing pattern 131 to obtain a captured image. The idea is to control projection levels of the projection section 111 in reference to the captured image, thereby setting color correction information (information for color correction) for correcting the colors of the projected images.

At this point, the projection section 111 generates the color correction information using multiple sensing patterns 131 such as a black (BL) sensing pattern 131-1, a blue (B) sensing pattern 131-2, a red (R) sensing pattern 131-3, a green (G) sensing pattern 131-4, and a white (W) sensing pattern 131-5 as the sensing patterns 131. The blue (B) sensing pattern 131-2, red (R) sensing pattern 131-3, and green (G) sensing pattern 131-4 are the sensing patterns 131 for color gamut correction. The black (BL) sensing pattern 131-1 is the sensing pattern 131 for correcting an illumination component (illuminance of the projection plane 102 under lighting other than the projection light). The white (W) sensing pattern 131-5 is the sensing pattern 131 for white balance correction.

As the method for correcting the colors of the projected image, the above-cited PTL 1 describes, for example, a method for correcting the color components of an input image using the spectral reflectance of the projection plane or the information about the colors under a light source. In another example, the above-cited PTL 2 describes a method for correcting colors by converting spectroscopy data to XYZ space in RGB components while correction information is being generated.

These methods involve uniformly correcting the colors of the entire projected image. Thus if the image is projected under complicated conditions involving projection onto a patterned or uneven projection plane for example, the accuracy of color correction of the projected image could be reduced and the imaging quality of the projected image could be lessened.

For example, depending on the shape of the projection plane 102, it may be difficult for the light from the projection section 111 on the projection plane 102 to be reflected in the direction of an observer observing a projected image with reduced luminance. In particular, if the projection plane 102 has a complicated uneven shape as in the example of FIG.

1, the decreasing rate of its luminance could vary depending on where the projected image is positioned. In such a case, attempts to uniformly correct the entire projected image fail to resolve the unevenness of the luminance with regard to the position. It is thus difficult to sufficiently lessen the drop in the imaging quality of the projected image.

If the projection plane 102 is red in color for example, the projected image could undergo change such as getting reddish. In particular, if the projection plane 102 has a complicated pattern as in the example of FIG. 1, the change of colors and the degree of such change could vary depending on where the projected image is positioned. In such a case, attempts to uniformly correct the entire projected image fail to resolve the unevenness of the color change relative to the position. It is therefore difficult to sufficiently lessen any drop in the imaging quality of the projected image.

In addition, the method described in the above-cited PTL 1 involves adjusting the gain of each of the R, G and B components while the color correction information is being generated. This, however, may not be sufficient in terms of color correction performance. The method described in the above-cited PTL 2 does not use prior information in obtaining correction values. This raises the possibility of prolonging processing time because the processes for obtaining an optimum value are complicated.

To lessen any drop in the accuracy of color correction, color correction information is set as the information for having the color of each pixel corrected for the projection section using a captured image obtained by a calibrated imaging section capturing the image projected to the projection plane by a calibrated projection section.

For example, there may be provided a color correction information setting section that sets as the information for having the color of each pixel corrected for the projection section using a captured image obtained by a calibrated imaging section capturing the image projected to the projection plane by a calibrated projection section.

Figure 2:
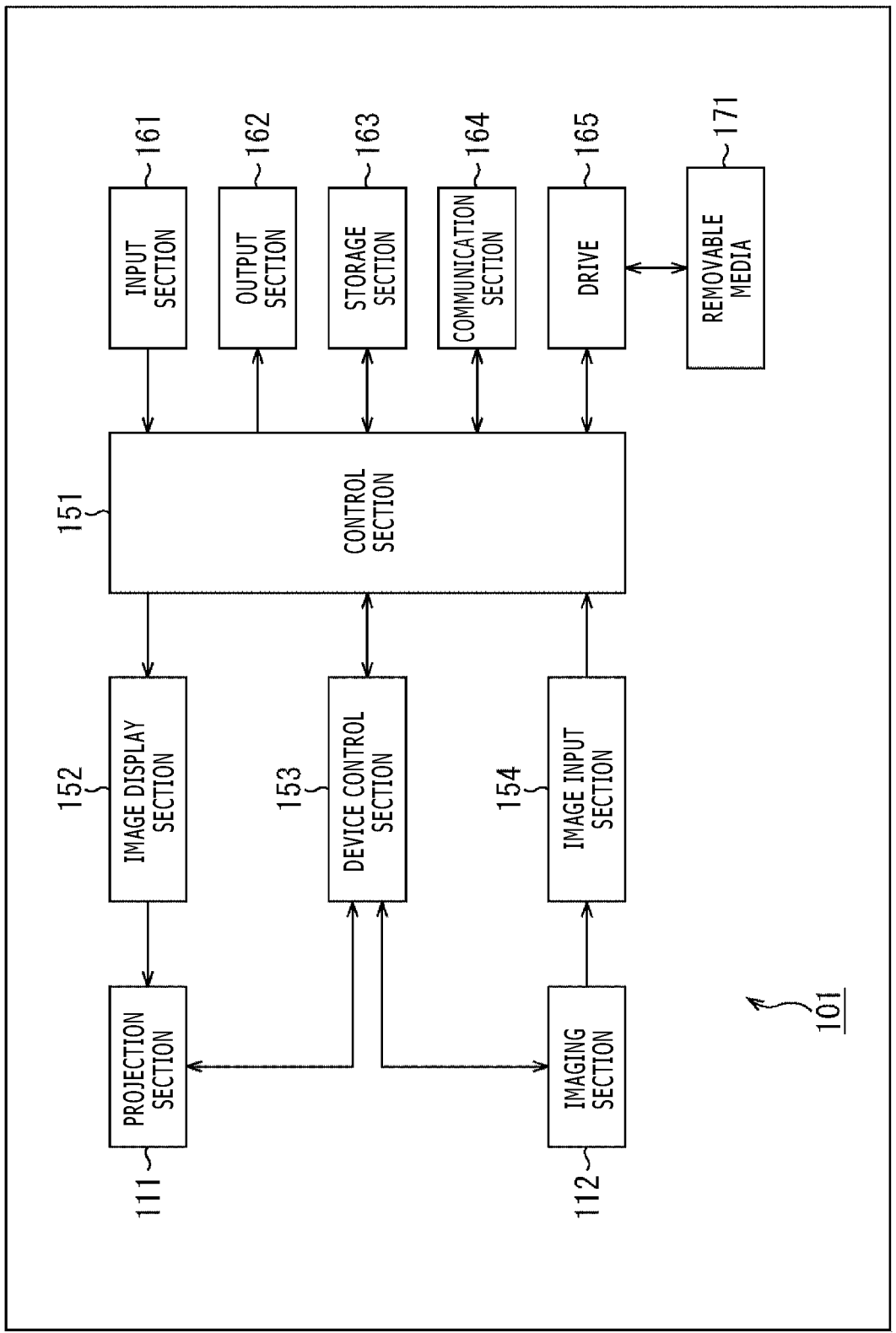
FIG. 2 is a block diagram depicting a typical configuration of a projection imaging apparatus.

Typical configuration of the projection imaging apparatus FIG. 2 is a block diagram depicting a typical configuration of the projection imaging apparatus 101. As depicted in FIG. 2, the projection imaging apparatus 101 includes a control section 151, an image display section 152, a device control section 153, and an image input section 154 in addition to the projection section 111 and the imaging section 112.

The control section 151 includes a central processing unit (CPU), a read-only memory (ROM), and a random access memory (RAM), all not depicted. The control section 151 performs processes related to controlling the components of the projection imaging apparatus 101 by executing programs and by processing data.

The image display section 152 performs image processing on the projected image under control of the control section 151. For example, the image processing section 152 performs predetermined image processing on an image fed from the control section 151, and sends the processed image to the projection section 111.

The device control section 153 performs processing related to the drive control of the projection section 111 and imaging section 112 under control of the control section 151. For example, the device control section 153 controls the projection section 111 to project the image fed from the image display section 152 or controls the imaging section 112 to capture an image (projected image) on the projection plane 102.

The image input section 154 performs image processing on the captured image obtained by the imaging section 112 under control of the control section 151. For example, the image input section 154 performs predetermined image processing on the captured image fed from the imaging section 112, and sends the processed captured image to the control section 151.

The projection imaging apparatus 101 further includes an input section 161, an output section 162, a storage section 163, a communication section 164, and a drive 165.

The input section 161 is composed of an input device that receives external information such as input from a user. For example, the input section 161 includes a keyboard, a mouse, operation buttons, a touch panel, a camera, a microphone, and an input terminal. The input section 161 may also include various sensors such as an acceleration sensor, an optical sensor, and a temperature sensor, as well input equipment such as a barcode reader. The output section 162 is composed of an output device for outputting information such as images and sound. For example, the output section 162 includes a display unit, speakers, and an output terminal.

The storage section 163 is formed by a storage medium for storing information such as programs and data. For example, the storage section 163 includes a hard disk, a RAM disk, and a nonvolatile memory. The communication section 164 is formed by a communication device that conducts communication for sending and receiving such information as programs and data to and from an external device via predetermined communication media. The communication section 164 is typically formed by a network interface. For example, the communication section 164 communicates with devices external to the projection imaging apparatus 101 (i.e., by sending and receiving programs and data thereto and therefrom).

The drive 165 is loaded with a piece of removable media 171 such as a magnetic disk, an optical disks, a magneto-optical disk, or a semiconductor memory, and reads information (e.g., programs and data) from the loaded removable medium. The drive 165 supplies the control section 151 with the information read from the removable media 171. Also, when loaded with a piece of writable removable media 171, the drive 165 may write to the loaded removable media 171 the information (e.g., programs and data) fed from the control section 151, for example.

It is assumed that the projection section 111 and the imaging section 112 have been calibrated and that their positional relations to each other (relative positions) have been defined beforehand.

The CPU of the control section 151 acquires programs held in the ROM or in the storage section 163 for example, loads the acquired programs into the RAM, and executes the loaded programs to perform various processes. As needed, the RAM may store data needed by the CPU in carrying out the diverse processes.

For example, the CPU of the control section 151 executes the programs as described above to perform processes related to controlling the projection section 111 and the imaging section 112 as well as processes related to setting the color correction information.

Flow of the Correction Setting Process

For example, the control section 151 (i.e., its CPU) performs a correction setting process to set color correction information. A typical flow of the correction setting process is explained below with reference to the flowchart of FIG. 3.

When the correction setting process is started, the control section 151 in step S101 obtains the distance to a projection object, i.e., the distance from the projection section 111 to the projection plane 102. Since the projection section 111 and the imaging section 112 have been calibrated and since their relative positions are already known, the control section 151 obtains the distance to the projection plane 102 (depth information) by triangulation using an image captured of the projected image for each pixel of the projection section 111. Based on the depth information about the projection plane 102 for each pixel, the control section 151 generates normal line information indicative of the shape of the projection plane 102. In accordance with the depth information and normal line information thus obtained, the control section 151 estimates a geometrical change in luminance, i.e., attenuation of luminance by distance for each pixel of the projection section 111. That is, the control section 151 obtains a luminance value for each pixel of the projection section 111.

The control section 151 stores the luminance value, depth information, and normal line information obtained per pixel as described above into the storage section 163, for example.

In step S102, the control section 151 obtains pixel-to-pixel correspondence relation between the projection section 111 and the imaging section 112. That is, the control section 151 generates pixel-to-pixel correspondence information indicating how the pixels projected by the projection section 111 correspond to the coordinates in the image captured by the imaging section 112. More specifically, the control section 151 controls the projection section 111 to project onto the projection plane a pattern image permitting identification of that position in the projected image which corresponds to each pixel of the projection section 111. The control section 151 further controls the imaging section 112 to capture the projected image to generate the captured image. As mentioned above, it is already known which position of the projected image included in the captured image corresponds to which pixel of the projection section 111. Obviously, it is already known which position of the captured image corresponds to which pixel of the imaging section 112. Thus on the basis of the projected image included in the captured image, the control section 151 obtains pixel-to-pixel correspondence relation between the projection section 111 and the imaging section 112.

The control section 151 stores the pixel-to-pixel correspondence relation obtained as described above into the storage section 163, for example.

In step S103, the control section 151 obtains the shape of the projection object and an incidence angle relative to an observing point. That is, in accordance with the depth information and normal line information about the projection object (projection plane 102), the control section 151 obtains, for each pixel of the projection section 111, incidence angle information indicating the incidence angle at which projection light is incident on the projection object of a specific material and of a specific shape as viewed from the observer observing the projected image. Based on the incidence angle information thus obtained, the control section 151 acquires, for each pixel of the projection section 111, attenuation information (also called reflectance information) indicating the amount of attenuation of luminance (also called the amount of correction attenuation) due to the incidence angle of the projected light on the projection plane 102 or the material and shape of the projection plane.

The control section 151 stores the attenuation information (reflectance information) obtained for each pixel as described above into the storage section 163, for example.

In step S104, the control section 151 generates the initial value of the sensing pattern 131 (initial output pixel value) and a target luminance value. The sensing pattern 131 is a predetermined test pattern image projected to set color correction information as the information for correcting the colors of the projected image (i.e., information about color correction). The test pattern may be any pattern (design). For example, the sensing pattern 131 may be set for each different color (e.g., constituted by the black (BL) sensing pattern 131-1, blue (B) sensing pattern 131-2, red (R) sensing pattern 131-3, green (G) sensing pattern 131-4, and white (W) sensing pattern 131-5, as in the example of FIG. 1). The control section 151 may read from the storage section 163 the luminance value, depth information, and normal line information for each pixel; pixel-to-pixel correspondence information, and the attenuation information for each pixel and, based on the retrieved information, may set the initial value (initial output pixel value) of the sensing pattern 131 for each pixel of the projection section 111.

The target luminance value is the luminance value of the projected image in an ideal state as viewed by the observer over the projection plane 102. The ideal state is a state in which the projected image remains unaffected by the colors and shape of the projection plane 102. That is, it is a state in which the projected image viewed by the observer is identical to the image projected by the projection section 111 (with no change in luminance, color, and shape). For example, the control section 151 reads the luminance value, depth information, and normal line information for each pixel; pixel-to-pixel correspondence information, and the attenuation information for each pixel from the storage section 163 and, based on the retrieved information, sets the target luminance value for each pixel of the projection section 111.

In step S105, the control section 151 adjusts the sensing pattern 131 in such a manner that the luminance value of the projection plane 102 gets closer to the target luminance value. As described above, the process of step S104 sets the initial value (initial output pixel value) of the sensing pattern 131. The control section 151 adjusts the initial value (initial output pixel value) of the sensing pattern 131 in a manner correcting the sensing pattern 131 more appropriately in color. The adjustment is repeated as needed. The adjustment will be discussed later in more detail.

In step S106, the control section 151 generates an environment model equation using the sensing pattern 131 adjusted in the process of step S105. Using the environment model equation thus generated, the control section 151 generates (sets) color correction information (correction data (correction model equation) for color correction) for each pixel. How the color correction information is set will be discussed later in more detail.

In step S107, the control section 151 stores the color correction information (correction data (correction model equation)) thus obtained into the storage section 163, for example.

When the process of step S107 is terminated, the correction setting process comes to an end.

Figure 3:
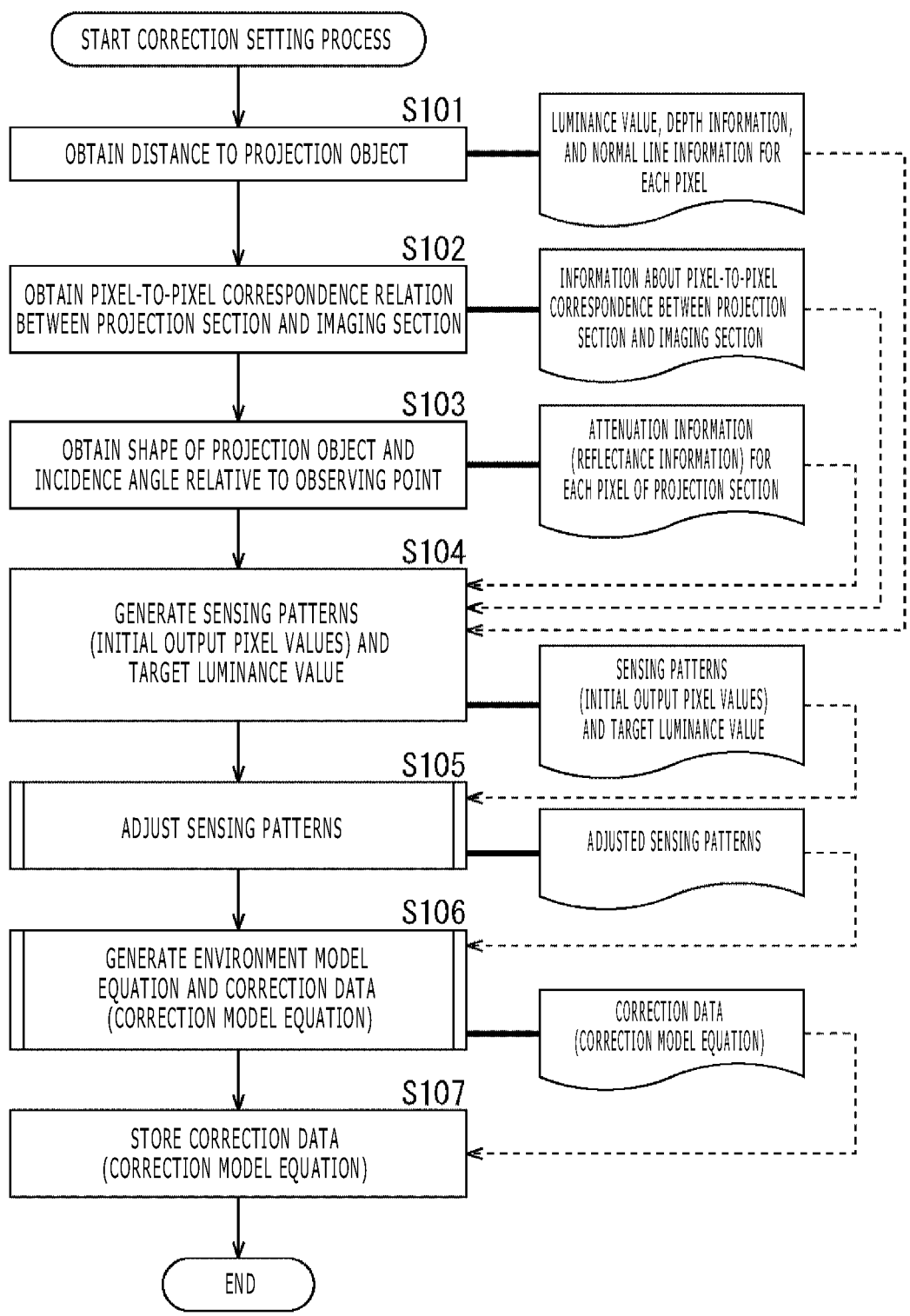
FIG. 3 is a flowchart explanatory of a typical flow of a correction setting process.
Figure 4:
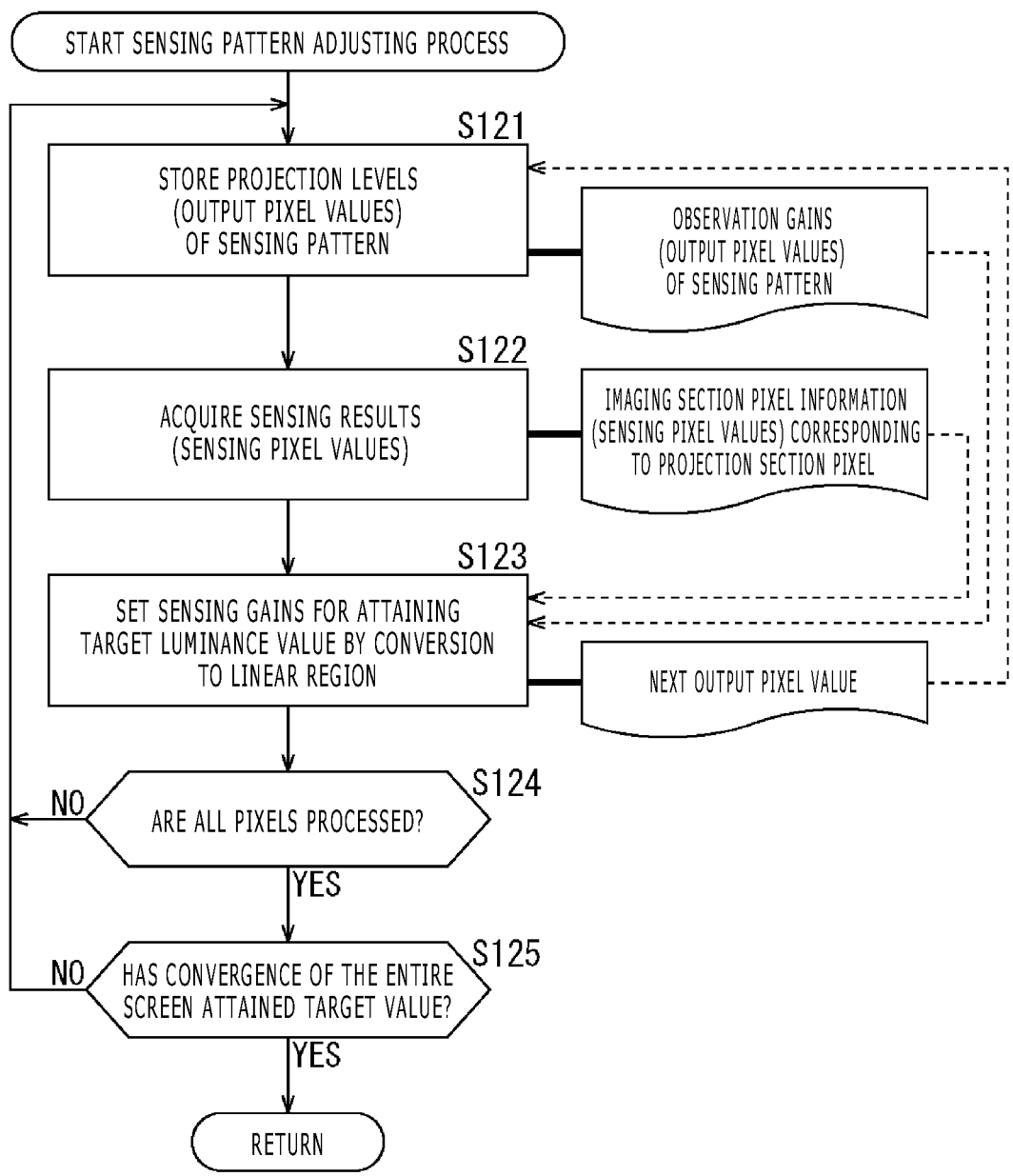
FIG. 4 is a flowchart explanatory of a typical flow of a sensing pattern adjusting process.

Flow of the sensing pattern adjusting process Described below with reference to the flowchart of FIG. 4 is a typical flow of the sensing pattern adjusting process executed in step S105 of FIG. 3.

When the sensing pattern adjusting process is started, the control section 151 in step S121 stores a projection level (output pixel value) of the sensing pattern 131 into the RAM in the control section 151 or into the storage section 163, for example. In the case where the process of step S121 is performed for the first time, the control section 151 stores the initial value (initial output pixel value) of the sensing pattern 131 set in the process of step S104 (in FIG. 3). In the case where the process in step S121 is performed for a second or subsequent time, the control section 151 stores the projection level (output pixel value) of the sensing pattern 131 set in the process of step S123, to be discussed later. The projection level of the sensing pattern 131 may also be called the observation gain of the sensing pattern.

In step S122, the control section 151 causes the projection section 111 to project the sensing pattern and controls the imaging section 112 to capture the projected image, thereby acquiring the captured image as sensing results (sensing pixel value). The control section 151 stores the sensing results (sensing pixel value) into the RAM in the control section 151 or into the storage section 163, for example. The sensing results (sensing pixel value) may also be called the imaging section pixel information corresponding to the pixel of the projection section.

In step S123, the control section 151 reads, from the storage section 163 for example, the observation gain of the sensing pattern and the imaging section pixel information corresponding to the pixel of the projection section. The control section 151 converts the data thus retrieved into a linear value (linear region) based on previously obtained results of calibration (calibration information) of the projection section 111 and imaging section 112 for light intensity calculation. In so doing, the control section 151 sets the gain (called the sensing gain) for attaining the target sensing results (target luminance value). That is, the control section 151 adjusts the gain in such a manner that the luminance value of the projected image on the projection plane 102 gets closer to the target luminance value.

The control section 151 repeats the processes of steps S121 to S123 on each of the pixels of the projection section 111 subject to processing.

In step S124, the control section 151 determines whether all pixels have been processed. If it is determined that there exists a pixel yet to be processed, the control section 151 selects that pixel as the target to be processed. Any of the pixels yet to be processed may be selected here. When a new pixel is selected as the processing target, control is returned to step S121 and the subsequent steps are repeated.

That is, the processes of steps S121 to S124 are repeated on each pixel of the projection section 11. When it is determined in step S124 that all pixels have been processed, control is transferred to step S125.

In step S125, the control section 151 obtains the degree of attainment of a target value for the entire projected image, and determines whether the degree of attainment is sufficient. The criteria (such a parameters and threshold values for determination) for determining whether the degree of attainment is sufficient may be selected as desired. The criteria may be selected in consideration of the desired imaging quality of the projected image. If it is determined that the convergence of the entire screen (i.e., sensing results) has failed to sufficiently attain the target value, control is returned to step S121 and the subsequent steps are repeated. That is, the sensing pattern adjustment (processes from step S121 to step S125) is repeated until the target value for the entire projected image is attained.

When it is determined that the convergence of the entire screen has sufficiently reached the target value, the sensing pattern adjustment is terminated. Control is then returned to FIG. 3.

Flow of the Correction Data Generating Process

Figure 5:
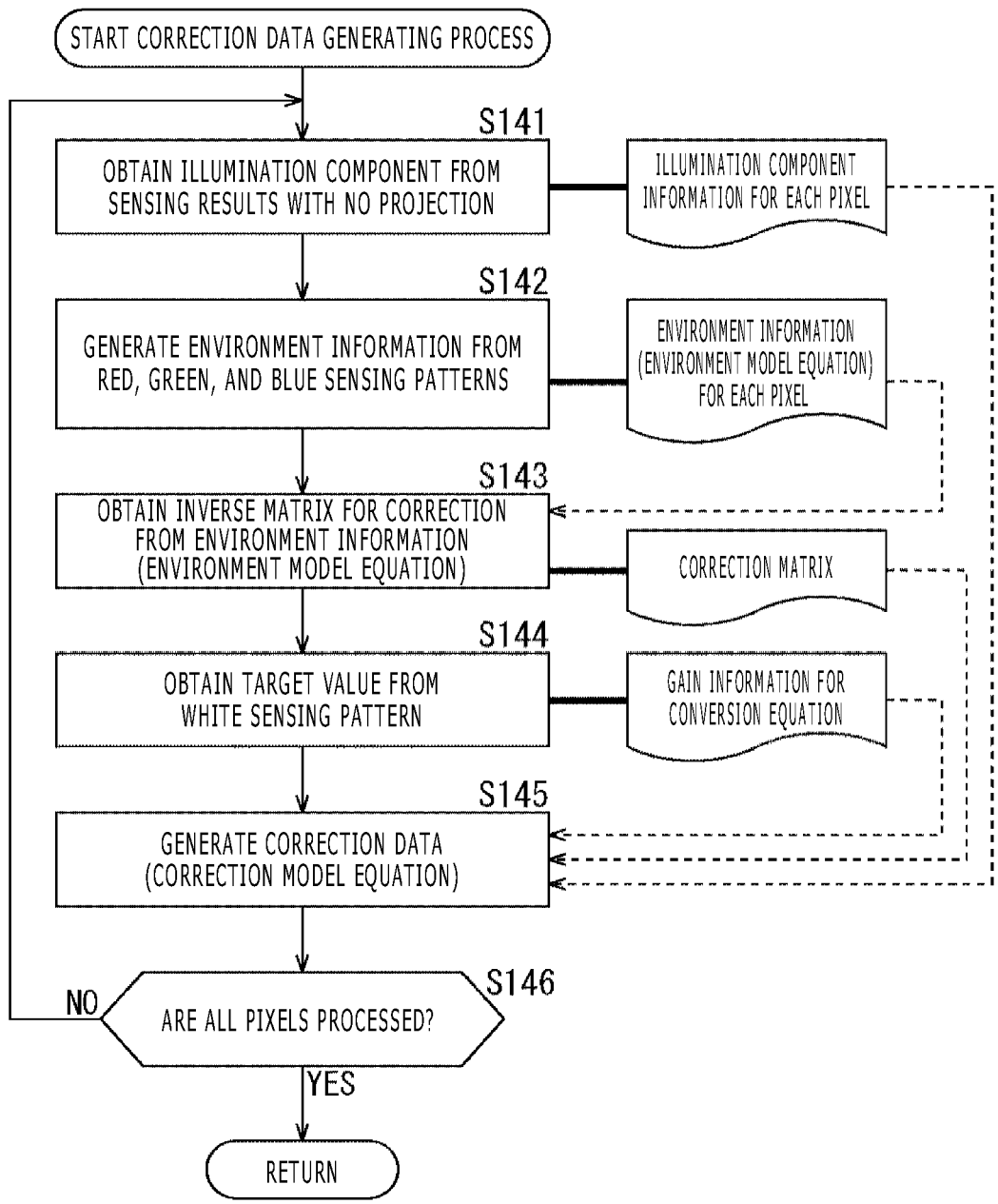
FIG. 5 is a flowchart explanatory of a typical flow of a correction data generating process.

Described below with reference to the flowchart of FIG. 5 is a typical flow of the correction data generating process executed in step S106 of FIG. 3.

When the correction data generating process is started, the control section 151 in step S141 obtains an illumination component (i.e., offset) as the luminance value of the projection plane 102 under lighting other than the projection light, based on the sensing results (captured image) with no projection (i.e., where the sensing pattern 131 is not projected). In this step, the control section 151 may cause the projection section 111 not to project the sensing pattern 131 at all or to project a sensing pattern 131 such as to obtain the illumination component (e.g., black (BL) sensing pattern 131-1).

In step S142, the control section 151 controls the projection section 111 to project the sensing patterns 131 of diverse colors for color gamut correction (e.g., blue (B) sensing pattern 131-2, red (R) sensing pattern 131-3, and green (G) sensing pattern 131-4). Based on the sensing results of each of the sensing patterns, the control section 151 generates environment information serving as the parameters indicative of the distance to and the shape of the projection plane 102. The environment information may be given by a determinant, for example, that accommodates the results from the colors of red, green, and blue.

In step S143, the control section 151 obtains an inverse matrix (also called a correction matrix) for correcting the environment information obtained in step S142, using previously acquired information (e.g., calibration information) related to the projection section 111 and imaging section 112. Correcting the environment information by use of the inverse matrix provides color gamut conversion of the projected image.

In step S144, the control section 151 controls the projection section 111 to project the sensing pattern 131 (e.g., white (W) sensing pattern 131-5) for white balance adjustment. The control section 151 obtains gain information indicating a specific gain by which to scale the inverse matrix (correction matrix) acquired in the process of step S143, based on the sensing results of the sensing pattern and on the amount of corrective attenuation (attenuation information (reflectance information) acquired in the process of step S103 (in FIG. 3)) of the projection object (projection plane 102). The control section 151 causes what is obtained here to be reflected in a correction equation (i.e., correction matrix) for the projection object. That is, performing the correction by use of the gain information provides white balance adjustment of the projected image.

In step S145, the control section 151 generates (sets) the correction data (correction model equation) by combining the illumination component information set in the process of step S141, the correction matrix set in the process of step S143, and the gain information for the conversion equation set in the process of step S144.

The processes of steps S141 to S145 are performed on the pixel targeted to be processed of the projection section 111. In step S146, the control section 151 determines whether these processes have been carried out on all pixels of the projection section 111. If it is determined that there exists a pixel yet to be processed, control is returned to step S141 and the subsequent steps are repeated. That is, the processes of steps S141 to S146 are performed on each pixel of the projection section 111. Following the repeated processing of steps S141 to S146, it is determined in step S146 whether all pixels have been processed. If all pixels are determined to have been processed, the correction data generating process is terminated, and control is returned to FIG. 3.

Correction Model Equation

The correction data generating process described above provides a correction model equation such as the mathematical equation (1) given below.

[Math. 1]

$$f_c(ci, c\gamma) = M_{3 \times 3} V_{3 \times 3} \{ V_{3 \times 3}^{-1} f_c(pi, p\gamma, \text{offset}) + F'_{3 \times 1} \} \quad (1)$$

In the equation (1) above, the left side ($f_c(ci, c\gamma)$) indicates the linear pixel value of the imaging section 112 represented by a pixel value ci and by a γ curve Cγ of the imaging section 112. A member $M_{3\times3}$ on the right side of the equation (1) indicates a matrix for the color gamut conversion of the projection section 111 and imaging section 112. A member $V_{3\times3}$ on the right side of the equation (1) stands for a matrix indicating that the projection section 111 is affected by the color of the projection plane.

Use of the Correction Information

At the time of projecting an image, the control section 151 performs color correction on each pixel of the image to be projected using the color correction information generated by carrying out the above-described processes. The control section 151 causes the projection section 111 to project the image thus corrected in color.

In so doing, the projection imaging apparatus 101 corrects more appropriately not only the projection plane formed of a simple, flat, monochrome wall surface but also the projection plane composed of a complicated shape involving complex patterns and colors. That is, the projection imaging apparatus 101 reduces any drop in the accuracy of color correction on more diverse projection planes.

Where normal maps are used to estimate light intensity attenuation contingent on the angle relative to a specific observing point, it is possible to complete color correction rapidly when any difference in view is corrected at the time of changing observing points.

Furthermore, based on the results of projecting the test pattern to the projection object, the reflectance of the object is estimated. Where the sensing pattern projected for a second and subsequent times is varied, the varying sensing pattern is allowed to converge so as to obtain the target expected value. This eliminates the need for optical characteristic information regarding the projector in use. It is thus easier to obtain the color correction information.

Using the projection section 111 and the imaging section 112, both calibrated, makes it easier to estimate the environment information about the projection plane 102 of the projection section 111. As a result, the shape of the projection plane 102, the distance from the projection section 111 to the projection plane 102, and the reflectance of the projection plane 102 are obtained more easily. Using the calibrated imaging section 112 makes it easier to acquire the pixel-to-pixel correspondence between the projection section 111 and the imaging section 112. That in turn makes it easier to obtain the color correction information for each of the pixels of the projection section 111. Where the color correction information is to be obtained, using the estimates of the above-described environment information helps reduce processing time taken for an optimum value to be acquired.

The correction target value is not predetermined, with the optimum value estimated from the information about the projection environment. This permits correction in a manner suitable for the environment.

Even if the characteristics of the projection section 111 are changed with the passage of time up to the attainment of the target value, any change in ultimate correction performance is minimized. That is because the target value is revised.

Also, with regard to the calculation time required to obtain the correction equation as discussed above, the control section 151 converts the results of the sensing pattern into the environment information, the calculated sensing pattern results serving as the environment information. This allows the inverse matrix for the environment information to be acquired at high speed. There is no need for conversion from spectroscopy data or for conversion of a color space. With no need to solve a minimization problem as well, the calculations involved are accomplished very quickly.

Others

The configuration of the apparatus and the flows of the processes discussed above are only examples and are not limitative of how the apparatus is configured and how the processes are performed according to the present technology. This technology applies to cases where the image projected to the projection plane by the calibrated projection section is captured by the calibrated imaging section so that the captured image may be used to set the color correction information for each pixel of the projection section.

For example, the projection imaging apparatus 101 may be configured in a manner different from the example in FIG. 2. Part of the configuration depicted in FIG. 2 may be omitted.

In another example, the normal line information may not be used in step S104 (in FIG. 3) of the correction setting process (for generating the initial value and target luminance value of the sensing pattern 131). The attenuation information for each pixel may not be used. That is, the processes of generating these items of information may be omitted.

In still another example, the correction data generated in the process of step S106 may be sent to another apparatus (e.g., server). Also, the corrected sensing pattern 131 generated in the process of step S105 may be fed to another apparatus (e.g., server). In such a case, the correction data generating process of step S106 may be carried out by the other apparatus (e.g., server).

The initial value and target luminance value of the sensing pattern 131 generated in the process of step S104 may be sent to another apparatus (e.g., server). In this case, the sensing pattern adjusting process of step S105 may be carried out by the other apparatus (e.g., server). Furthermore, the correction data generating process of step S106 may also be performed by another apparatus (e.g., server).

Diverse items of information generated in the processes of steps S101 to S103 may be sent to another apparatus (e.g., server). In such a case, the process of step S104 (for generating the initial value and target luminance value of the sensing pattern 131) may be carried out by the other apparatus (e.g., server). Also, the sensing pattern adjusting process of step S105 may be performed by another apparatus (e.g., server). Furthermore, the correction data generating process of step S106 may be executed by another apparatus (e.g., server).

That is, the correction data generating process of step S106 may be carried out by any information processing apparatus other than the projection imaging apparatus 101. In other words, the present technology may also be applied to any information processing apparatus other than the projection imaging apparatus 101.

In the sensing pattern adjusting process (FIG. 4), the process of step S125 may be omitted with no consideration for the convergence of the entire screen. Also, the sensing pattern adjusting process may be performed only on some of the pixels, the other pixels being subjected to an interpolation process, for example.

In the correction data generating process (FIG. 5), the illumination component information may not be used when the correction data is generated (in step S145). The gain information for the conversion equation may not be used. In such a case, the processes for generating these items of information may be omitted. Also, the correction data generating process may be performed only on some of the pixels, the other pixels being subjected to an interpolation process, for example.

Furthermore, processes other than those discussed above may be performed, and data other than those described above may be utilized.

2. Second Embodiment

Projection Imaging System

The first embodiment was discussed above in connection with the color correction for one projection imaging apparatus 101. However, any number of projection imaging apparatuses 101 may be configured, i.e., multiple projection imaging apparatuses may 101 be provided. For example, the present technology may also be applied to a system that has multiple projection imaging apparatuses 101 working in concert to project images.

Figure 6:
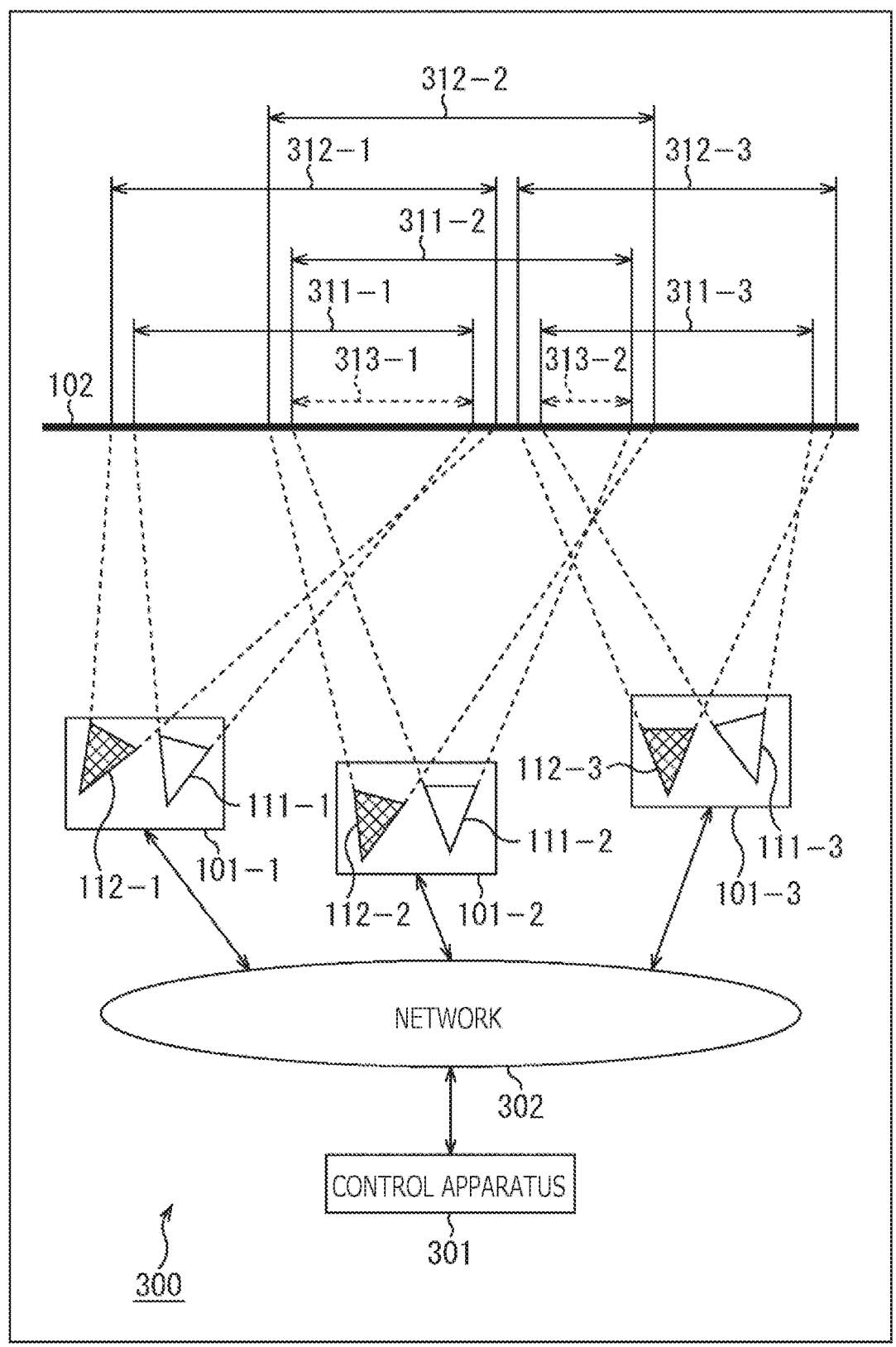
FIG. 6 is a schematic view depicting a typical configuration of a projection imaging system.

FIG. 6 depicts a typical configuration of one embodiment of a projection imaging system to which the present technology is applied. A projection imaging system 300 depicted in FIG. 6 is a system that has three projection imaging apparatuses 101 (projection imaging apparatuses 101-1, 101-2 and 101-3) and a control apparatus 301 working in concert to project images.

As discussed above in connection with the first embodiment, each projection imaging apparatus 101 includes the projection section 111 and the imaging section 112. For example, the projection imaging apparatus 101-1 includes a projection section 111-1 and an imaging section 112-1; the projection imaging apparatus 101-2 includes a projection section 111-2 and an imaging section 112-2; and the projection imaging apparatus 101-3 includes a projection section 111-3 and an imaging section 112-3.

Each projection imaging apparatus 101 is connected communicably with a network 302. The connection may be wired, wireless, or both.

The network 302 may be any communication network permitting wired communication, wireless communication, or both. The network 302 may be constituted by one or multiple communication networks. For example, the network 302 may include a communication network or networks and a communication channel or channels of any suitable communication standard, such as the Internet, a public telephone network, a mobile broadband network such as a 3G or 4G network, a wide area network (WAN), a local area network (LAN), a wireless communication network based on the Bluetooth (registered trademark) standard, communication channels for proximity wireless communication such as near field communication (NFC), infrared communication channels, and a wired communication network based on such standards as High-Definition Multimedia Interface (HDMI; registered trademark) or Universal Serial Bus (USB).

The control apparatus 301 is connected communicably with the network 302. That is, the communication apparatus 301 may communicate with each projection imaging apparatus 101 via the network 302. The connection may be wired, wireless, or both.

The control apparatus 301 controls the projection imaging apparatuses 101 by communication, causing them to perform such processes as projection and imaging as required. For example, the control apparatus 301 may cause the individual projection imaging apparatuses 101 to project different pieces of one big image to the projection plane 102, thereby forming a projected image constituting a single big image on the projection plane 102.

In the example of FIG. 6, on the projection plane 102, a projection range 311-1 of the projection section 111-1 in the projection imaging apparatus 101-1 and a projection range 311-2 of the projection section 111-2 in the projection imaging apparatus 101-2 overlap with each other partially in an overlapping portion 313-1. That is, the image projected by the projection section 111-1 and the image projected by the projection section 111-2 overlap with each other to form the overlapping portion 313-1 on the projection plane 102.

Also, on the projection plane 102, a projection range 311-2 of the projection section 111-2 in the projection imaging apparatus 101-2 and a projection range 311-3 of the projection section 111-3 in the projection imaging apparatus 101-3 overlap with each other partially in an overlapping portion 313-3. That is, the image projected by the projection section 111-2 and the image projected by the projection section 111-3 overlap with each other to form the overlapping portion 313-2 on the projection plane 102.

Further, on the projection plane 102, an imaging range 312-1 of the imaging section 112-1 in the projection imaging apparatus 101-1 includes the projection range 311-1 of the projection section 111-1. Likewise, an imaging range 312-2 of the imaging section 112-2 in the projection imaging apparatus 101-2 includes the projection range 311-2 of the projection section 111-2. Also, an imaging range 312-3 of the imaging section 112-3 in the projection imaging apparatus 101-3 includes the projection range 311-3 of the projection section 111-3.

It is assumed that the projection section 111 and the imaging section 112 in each projection imaging apparatus 101 have been calibrated beforehand.

In this projection imaging system 300, the control apparatus 301 causes each projection imaging apparatus 101 to generate color correction information for each pixel. Using the color correction information generated by the control apparatus 301, each projection imaging apparatus 101 performs color correction on each pixel of the image to be projected, before projecting the color-corrected image.

Figure 7:
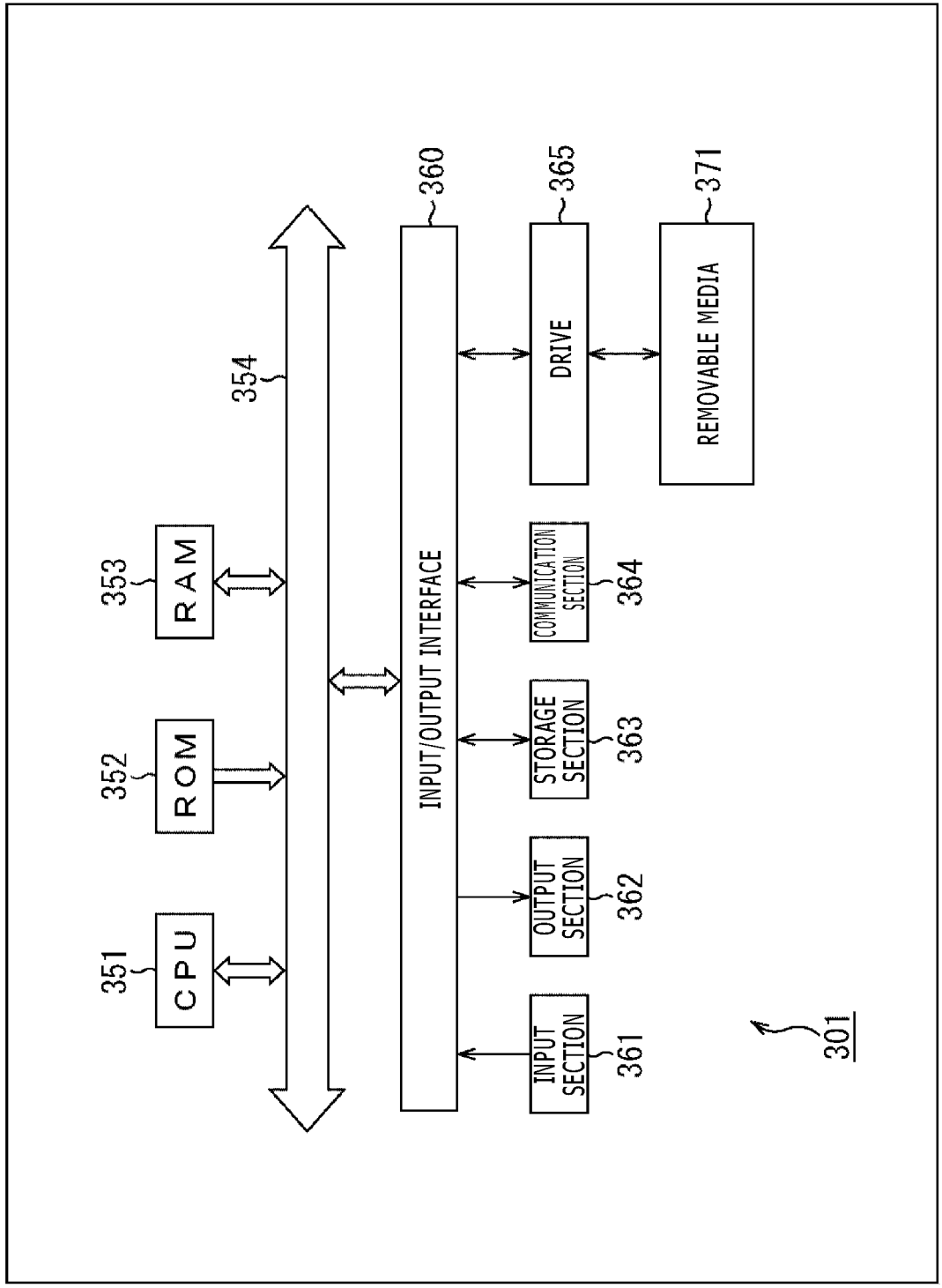
FIG. 7 is a block diagram depicting a typical configuration of a control apparatus.

Typical configuration of the control apparatus FIG. 7 is a block diagram depicting a typical configuration of the control apparatus 301 indicated in FIG. 6. As depicted in FIG. 7, the control apparatus 301 includes a CPU 351, a ROM 352, a RAM 353, a bus 354, an input/output interface 360, an input section 361, an output section 362, a storage section 363, a communication section 364, and a drive 365.

The CPU 351, ROM 352, and RAM 353 are interconnected via the bus 354. The bus 354 is also connected with the input/output interface 360. The input/output interface 360 is connected with the input section 361, output section 362, storage section 363, communication section 364, and drive 365.

The input section 361 is composed of an input device that receives external information such as input from a user. For example, the input section 361 may include a keyboard, a mouse, operation buttons, a touch panel, a camera, a microphone, and an input terminal. The input section 361 may further include sensors such as an acceleration sensor, an optical sensor, and a temperature sensor, as well as input equipment such as a barcode reader. The output section 362 is formed by an output device that outputs information such as images and sound. For example, the output section 362 may include a display unit, speakers, and an output terminal.

The storage section 363 is constituted by a storage medium for storing information such as programs and data. For example, the storage section 363 may include a hard disk, a RAM disk, and a nonvolatile memory. The communication section 364 is made up of a communication device that conducts communication to send and receive information such as programs and data to and from an external apparatus via predetermined communication media. The communication section 364 is typically formed by a network interface. For example, the communication section 364 communicates with an apparatus external to the control apparatus 301 (i.e., by sending and receiving programs and data to and from the external apparatus).

The drive 365 is loaded with a piece of removable media 371 such as a magnetic disk, an optical disk, a magneto-optical disk, or a semiconductor memory, and reads information (programs and data) from the loaded removable medium. The drive 365 feeds the information retrieved from the removable media 371 to the CPU 351 or to the RAM 353, for example. When loaded with a piece of writable removable media 371, the drive 365 may write to the loaded writable removable media 371 the information (programs and data) fed from the CPU 351 or from the RAM 353, for example.

The CPU 351 performs various processes by executing the programs loaded into the RAM 353 following retrieval from the storage section 363 via the input/output interface 360 and the bus 354 for example. As needed, the RAM 353 may store data needed by the CPU 351 in carrying out the diverse processes.

By executing the programs as described above, the CPU 351 performs processes related to setting the color correction information as well as processes related to controlling each projection imaging apparatus 101, for example.

Flow of the Correction Setting Process

Figure 8:
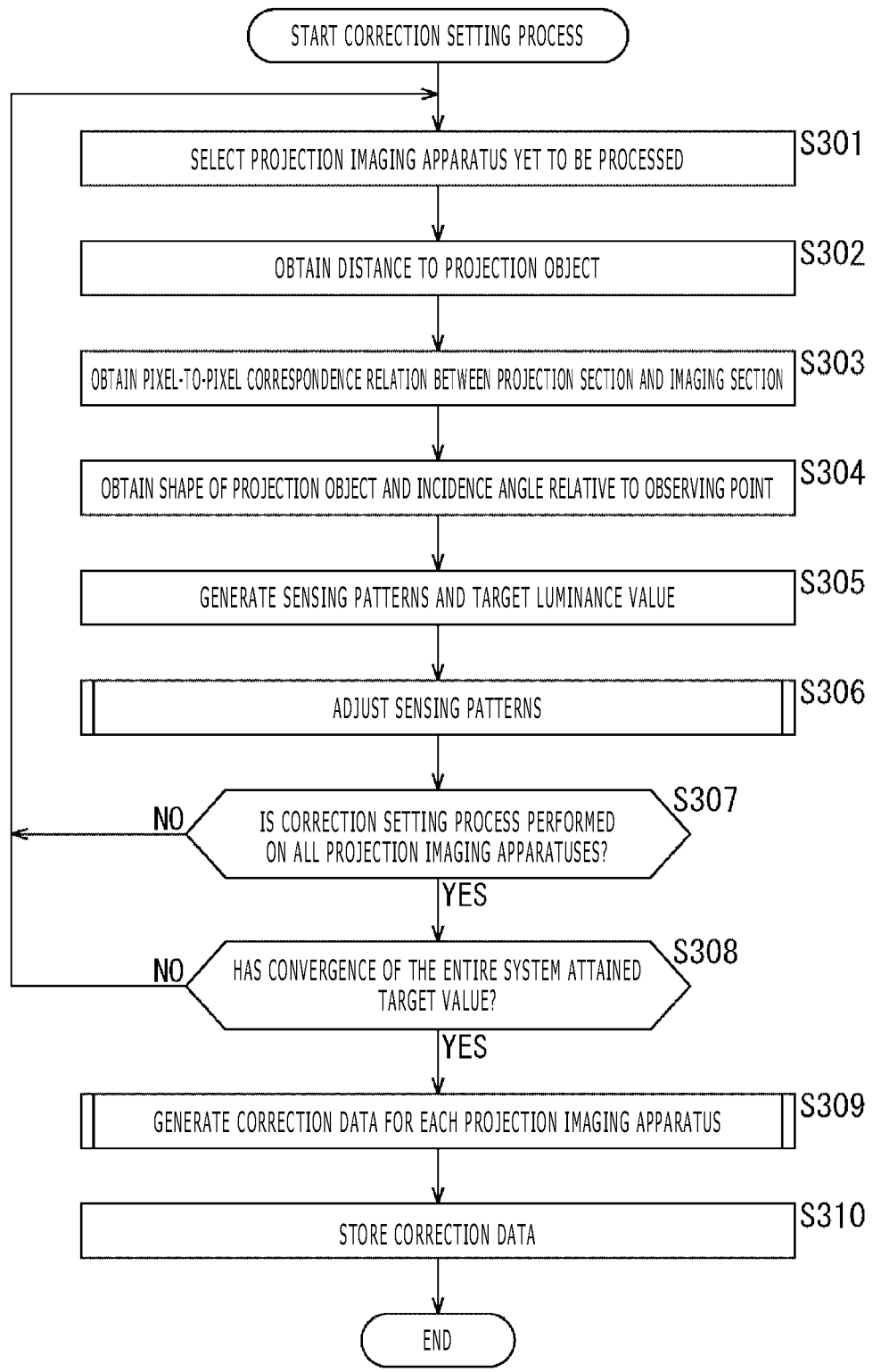
FIG. 8 is a flowchart explanatory of a typical flow of the correction setting process.

Described below with reference to the flowchart of FIG. 8 is a typical flow of the correction setting process carried out by the control apparatus 301 for setting color correction information.

In the second embodiment, the control apparatus 301 generates the color correction information for each projection imaging apparatus 101. The color correction information for each projection imaging apparatus 101 is generated basically in the same manner as in the first embodiment. The second embodiment also involves determining the degree of attainment of the target value for an entire single image projected to the projection plane 102 by all projection imaging apparatuses 101.

The control apparatus 301 generates and adjusts the sensing pattern for each projection imaging apparatus 101 (steps S301 to S307). The control apparatus 301 then verifies whether the convergence of the system as a whole has sufficiently attained the target value (step S308). Following the verification, the control apparatus 301 generates the correction data for each projection imaging apparatus 101 (step S309).

Thus in step S301, the CPU 351 of the control apparatus 301 selects the projection imaging apparatus 101 targeted to be processed from among the projection imaging apparatuses 101 yet to be processed. The processes of steps S302 to S306 are performed on the selected projection imaging apparatus 101 in the same manner as the processes of steps S101 to S105 in FIG. 3. That is, in step S306, the sensing pattern adjusting process is performed as described above with reference to the flowchart of FIG. 4.

When the adjusted sensing pattern 131 is obtained as described above for the projection imaging apparatus 101 targeted to be processed, the CPU 351 of the control apparatus 301 goes to step S307. In step S307, the CPU 351 determines whether the (adjusted) sensing pattern 131 is generated for all projection imaging apparatuses 101 through the correction setting process. If it is determined that there exists a projection imaging apparatus 101 for which the sensing pattern 131 has yet to be generated, control is returned to step S301 and the subsequent steps are repeated. That is, a new projection imaging apparatus 101 yet to be processed is selected as the processing target. The correction setting process (processes of steps S302 to S306) is then carried out on the newly selected projection imaging apparatus 101.

When the (adjusted) sensing patterns 131 have been generated for all projection imaging apparatuses 101 by the repeated processes of steps S301 to S307, control is transferred to step S308.

In step S308, the CPU 351 of the control apparatus 301 determines whether the degree of attainment obtained of the target value of the entire image projected by all projection imaging apparatuses 101 is sufficient. The criteria (such as parameters and threshold values) for the determination may be selected as desired. The criteria may be determined in consideration of the desired imaging quality of projected images, for example. If it is determined that the convergence of the entire system (i.e., sensing results of all projection imaging apparatuses 101) has failed to sufficiently attain the target value, control is returned to step S301 and the subsequent steps are repeated. That is, the sensing pattern adjustment (i.e., processes of steps S301 to S308) is repeated until the target value of the entire image projected by all projection imaging apparatuses 101 is attained.

When it is determined in step S308 that the convergence of the entire system has sufficiently attained the target value, control is transferred to step 309.

In step S309, the CPU 351 of the control apparatus 301 generates the correction data for each projection imaging apparatus 101. That is, as described above with reference to the flowchart of FIG. 5, the correction data generating process is carried out on each projection imaging apparatus 101. In the case of the projection imaging system 300 (FIG. 6), for example, the correction data generating process is performed on each of the three projection imaging apparatuses 101 configured (i.e., the process is repeated three times).

When the correction data is generated for each projection imaging apparatus 101 as described above, control is transferred to step S310.

In step S310, the CPU 351 of the control apparatus 301 writes the correction data generated for each projection imaging apparatus 101 in the process of step S309 to the RAM 353, to the storage section 363, or to the removable media 371 for example. The CPU 351 of the control apparatus 301 then controls the communication section 364 in a suitably timed manner to feed the correction data to each projection imaging apparatus 101 as the color correction information. Alternatively, the CPU 351 may feed the generated correction data to the projection imaging apparatuses 101 via the communication section 364 without writing the data to the storage section 363 for example.

When the process of step S310 is terminated, the correction setting process comes to an end.

Use of the Correction Information

When an image is to be projected, the control section 151 of each projection imaging apparatus 101 performs color correction on each of the pixels of the image to be projected using the color correction information fed from the control apparatus 301, and causes the projection section 111 to project the color-corrected image.

In this manner, the projection imaging system 300, when configured with multiple projection imaging apparatuses 101, permits more appropriate color correction on more diverse projection planes so as to reduce any drop in the accuracy of color correction.

When only one projection imaging apparatus 101 is configured, an occlusion may occur depending on the angle between the projection imaging apparatus 101 and the projection plane 102, projection light being occluded in some cases. Where multiple projection imaging apparatuses 101 are configured, such cases are eliminated. That is, using multiple projection imaging apparatuses 101 reduces any drop in the accuracy of color correction more effectively.

Others

The configuration of the system and that of the apparatus, as well as the flows of the processes discussed above are only examples and are not limitative of how the system and the apparatus are configured and how the processes are performed according to the present technology.

For example, whereas three projection imaging apparatuses 101 are depicted in FIG. 6, the projection imaging system 300 may include as many projection imaging apparatuses 101 as needed. Likewise, the projection imaging system 300 may include as many control apparatuses 301 as needed. The network 302 may be connected with devices other than those depicted in FIG. 6.

Also, the control apparatus 301 may be configured in a manner different from what is depicted in FIG. 7. Part of the configuration indicated in FIG. 7 may be omitted.

Basically, as in the first embodiment, the correction setting process (FIG. 8) may have part of its steps or data omitted, include steps other than those depicted in FIG. 8, or utilize data not indicated in FIG. 8. Some of the steps may be performed by another apparatus.

For example, if multiple projection imaging apparatuses 101 are used to project images so that they may partially overlap with one another on the projection plane 102 as in the example of FIG. 6 (to make overlapping projections), the overlapping region appears brighter than the other regions. With this taken into account, the region under overlapping projections may be used to generate the gain information for the conversion equation (in step S144 of FIG. 5). In this case, the target value may be estimated using the total sum of light intensity values of the projection sections 111 projecting images to the overlapping region. This permits more accurate setting of the gain information for the conversion equation. That is, the light intensity adjustment for the entire projected image is accomplished more accurately.

Where the projection imaging system 300 has multiple projection imaging apparatuses 101 configured, the correction setting process on each projection imaging apparatus 101 may utilize the information derived from the other projection imaging apparatuses 101. Thus if the projection plane 102 is not a perfect reflecting diffuser, the imaging sections 112 using the captured images may be prioritized to permit the correction in consideration of the reflectance of the projection plane 102. That is, any drop in the accuracy of color correction is reduced.

For example, a normal vector indicative of the shape information about the projection plane 102 forms an angle θ relative to a directional vector ranging from the projection plane 102 to each projection imaging apparatus 101. The luminance value gained from the image captured by the projection imaging apparatus 101 relative to which the angle θ is the smallest is obtained as the maximum reflection luminance value. The luminance value gained from the image captured by the projection imaging apparatus 101 relative to which the angle θ is the largest is obtained as the minimum reflection luminance value. From the two luminance values, a luminance attenuation curve is obtained reflecting the changes of the formed angle θ.

If the luminance attenuation curve changes abruptly (i.e., where there is a large difference between the maximum reflection luminance and the minimum reflection luminance), the reflectance of the projection plane is corrected. The luminance attenuation curve represented by the angle θ formed by the directional vector ranging from the projection plane 102 to the projection imaging apparatus 101 is applied to the luminance values given by the individual projection imaging apparatuses 101. The environment model is updated by correcting the luminance values in the above manner.

Further, the directional vector ranging from the projection plane 102 to the observer is used to calculate the luminance values of all projection imaging apparatuses 101 on the projection plane 102 as viewed from the observer. The smallest of these luminance values is given as the target luminance value.

The gains of the correction models for the individual projection imaging apparatuses 101 are then caused to converge on the target luminance value.

In the manner described above, even when the projection plane 102 is of any shape and not a perfect reflecting diffuser, projections are made with smaller differences in luminance as viewed from the observer. Because the gains of the correction models are allowed to converge rapidly, the correction model proportionate to the target luminance value is eventually prepared more quickly than if only one projection imaging apparatus 101 is configured. This not only shortens processing time but also lowers any increase in load.

3. Third Embodiment

Typical Configurations of the Projection Imaging System and the Projection Imaging Apparatus The configuration of the projection imaging apparatus and that of the projection imaging system, both implementing the present technology, are not limited to the examples discussed above. For example, the control apparatus 301 may be omitted as in a projection imaging system 400 depicted in Subfigure A of FIG. 9. In the projection imaging system 400, the above-described correction setting process and other processes may be carried out by any of the projection imaging apparatuses 101. There may be provided any desired number of projection imaging apparatuses 101 for doing the processing, i.e., there may be one or multiple projection imaging apparatuses 101. Such configurations allow the projection imaging system 400 to reduce any drop in the accuracy of color correction.

Figure 9:
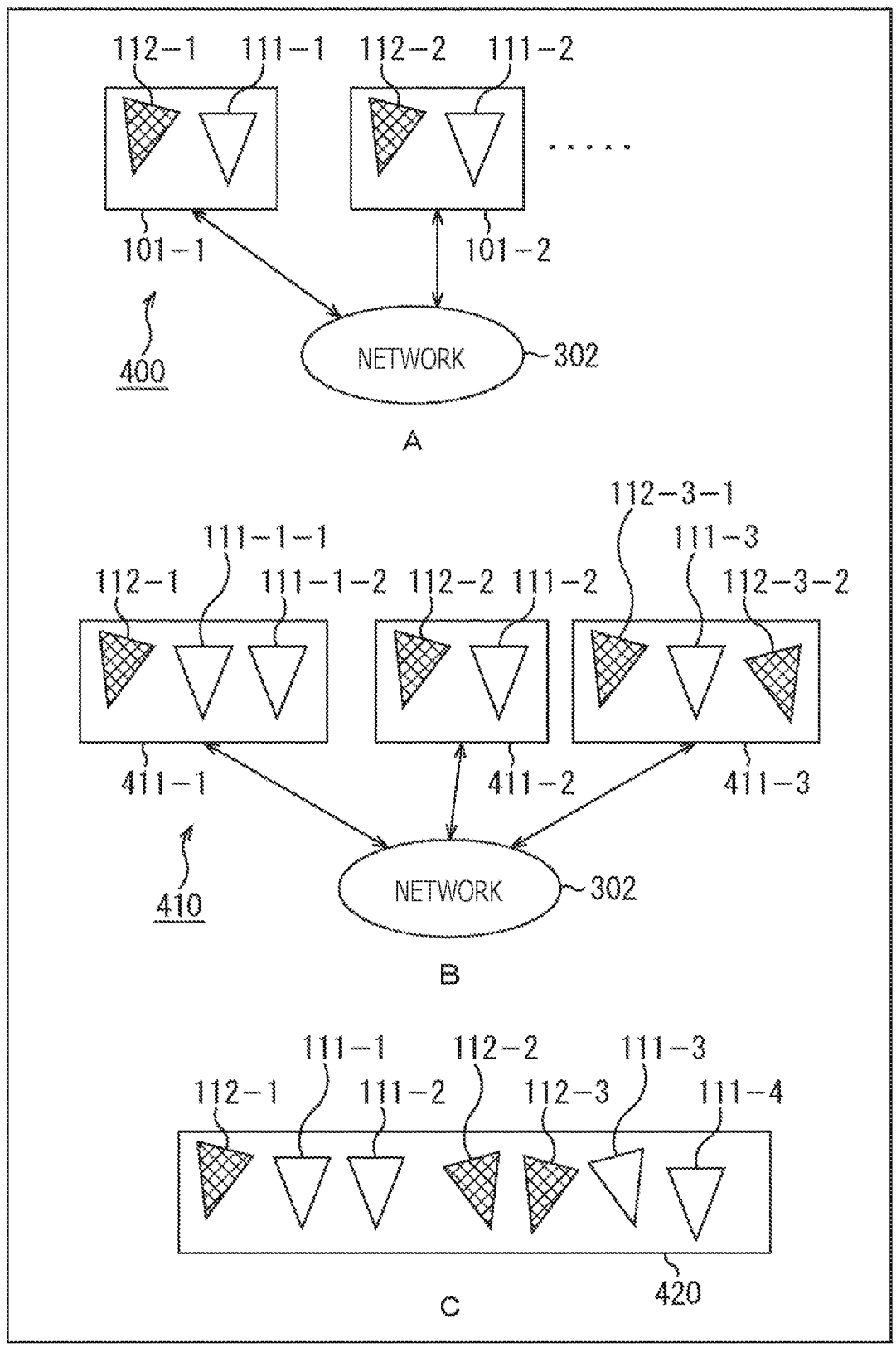
FIG. 9 is a set of schematic diagrams depicting other typical configurations of the projection imaging system and the projection imaging apparatus.

Also, the projection imaging apparatuses may be configured differently from one another, as in a projection imaging system 410 depicted in Subfigure B of FIG. 9. As indicated in Subfigure B of FIG. 9, the projection imaging system 410 includes three projection imaging apparatuses 411 connected communicably with the network 302 (projection imaging apparatuses 411-1, 411-2 and 411-3).

The projection imaging apparatus 411-1 has two projection sections 111 (projection sections 111-1-1 and 111-1-2) and one imaging section 112-1. The projection imaging apparatus 411-2 has one projection section 111-2 and one imaging section 112-2. The projection imaging apparatus 411-3 has one projection section 111-3 and two imaging sections 112 (imaging sections 112-3-1 and 112-3-2).

Even where the projection imaging apparatuses 411 are configured differently from one another, the processing is performed in the same manner as with the second embodiment. That is, the projection imaging system 410 also reduces any drop in the accuracy of color correction.

Furthermore, as in a projection imaging apparatus 420 depicted in Subfigure C of FIG. 9, there may be provided multiple projection sections 111 and multiple imaging sections 112. In this case, as in the projection imaging system 300, the projection imaging apparatus 420 may generate the color correction information for each of the projection sections 111 configured. This also allows the projection imaging apparatus 420 to reduce any drop in the accuracy of color correction.

Software

The series of the processes described above may be executed either by hardware or by software. Where these processes are to be carried out by software, the program constituting the software is installed from a network or from a recording medium.

In the example of FIG. 2, the recording medium is a piece of the removable media 171 having the program recorded thereon and distributed apart from the apparatus proper to deliver the program to the user. The removable media 171 include magnetic disks (including flexible disks) and optical disks (including compact disk (CD)-ROM and digital versatile disk (DVD)). The removable media 171 also include magneto-optical disks (including Mini Disc (MD)) and semiconductor memory. In such cases, a piece of the removable media 171 may be loaded into the drive 165, for example. The drive 165 may then read the program from the loaded removable medium and install the retrieved program into the storage section 163.

In the example of FIG. 7, the recording medium is a piece of the removable media 371 having the program recorded thereon and distributed apart from the apparatus proper to deliver the program to the user. The removable media 371 include magnetic disks (including flexible disks) and optical disks (including CD-ROM and DVD). The removable media 371 also include magneto-optical disks (including MD) and semiconductor memories. In such cases, a piece of the removable media 371 may be loaded into the drive 365, for example. The drive 365 may then read the program from the loaded removable medium and install the retrieved program into the storage section 363.

The program may be offered alternatively via wired or wireless transmission media such as a local area network, the Internet, or a digital satellite service. In the example of FIG. 2, the program may be received by the communication section 164 and installed into the storage section 163. In the example of FIG. 7, the program may be received by the communication section 364 and installed into the storage section 363.

As another alternative, the program may be preinstalled in the storage section or in the ROM, for example. In the example of FIG. 2, the program may be installed beforehand in the storage section 163 or in the ROM inside the control section 151. In the example of FIG. 7, the program may be preinstalled in the storage section 363 or in the ROM 352.

Also, the program to be executed by a computer may be processed chronologically, i.e., in the sequence depicted in this description; in parallel with other programs, or in otherwise appropriately timed fashion such as when it is invoked as needed.

In this description, the steps describing the program recorded on the recording medium represent not only the processes that are to be carried out chronologically in the depicted sequence but also processes that may be performed parallelly or individually and not necessarily in chronological fashion.

The process of each of the steps described above may be executed by any of the above-mentioned devices or apparatuses or by some other suitable device or apparatus. In such cases, the device or apparatus for executing the process need only have the function (e.g., functional block) necessary for process execution. The information necessary for the process may be transmitted to the device or apparatus carrying out the process.

Others

In this description, the term "system" refers to an aggregate of multiple components (devices or modules (parts)). It does not matter whether all components are housed in the same enclosure. Thus a system may be configured with multiple devices housed in separate enclosures and interconnected via a network, as well as with a single device that houses modules in a single enclosure.

Any configuration explained in the foregoing paragraphs as one device (or processing section) may be divided into multiple devices (or processing sections). Conversely, the configurations explained above as multiple devices (or processing sections) may be unified into one device (or processing section). Also, the configuration of each device (or processing section) may obviously be supplemented with a configuration or configurations other than those discussed above. Furthermore, part of the configuration of a device (or processing section) may be included in the configuration of another device (or processing section), provided the configurations and the workings remain substantially the same for the system as a whole.

Whereas some preferred embodiments of the present disclosure have been described above in detail with reference to the accompanying drawings, these embodiments are not limitative of this disclosure. It is obvious that those skilled in the art will easily conceive variations or alternatives of the disclosure within the scope of the technical idea stated in the appended claims. It is to be understood that such variations, alternatives and other ramifications also fall within the technical scope of the present disclosure.

For example, the present technology may be implemented as a cloud computing setup in which a single function is processed cooperatively by multiple networked devices on a shared basis.

Also, each of the steps discussed in reference to the above-described flowcharts may be executed either by a single device or by multiple devices on a shared basis.

Furthermore, if a single step includes multiple processes, these processes included in the single step may be executed either by a single device or by multiple devices on a shared basis.

In addition, the present technology may be implemented as any configuration incorporated in any of the above-described devices or apparatuses or of those constituting the above-mentioned system, the configuration including a processor in the form of a system large scale integration (LSI), a module that uses multiple such processors, a unit that uses multiple such modules, or a set that supplements the unit with additional functions (as part of the device or apparatus), for example.

The present technology, when implemented, may be configured preferably as follows:

(1) An information processing apparatus including: a color correction information setting section configured to use a captured image captured by a calibrated imaging section imaging a projected image projected to a projection plane by a calibrated projection section in order to set color correction information as the information for correcting a color of each pixel of the projection section.

(2) The information processing apparatus as stated in paragraph (1) above, in which, based on the projected image and the captured image, the color correction information setting section obtains, for each pixel of the projection section, environment information as the information indicative of an effect on the color attributable to the projected image being projected onto the projection plane, the color correction information setting section further setting the color correction information using the environment information for each pixel of the projection section.

(3) The information processing apparatus as stated in paragraph (2) above, in which, based on a captured image captured of the projection plane to which the projected image has yet to be projected, the color correction information setting section further obtains an illumination component of the projection plane for each pixel of the projection section,
the color correction information setting section obtains a gain amount of the color correction information from the projected image in white for each pixel of the projection section, and
the color correction information setting section sets the color correction information using the illumination component, the gain amount, and the environment information for each pixel of the projection section.

(4) The information processing apparatus as stated in any one of paragraphs (1) to (3) above, further including: an adjustment section configured to adjust, for each pixel of the projection section, a projection level of the projection section projecting the projected image on the basis of a pixel value of each pixel of the captured image,
in which the color correction information setting section sets the color correction information using the projected image projected by the projection section of which the projection level for each pixel is adjusted by the adjustment section.

(5) The information processing apparatus as stated in paragraph (4) above, in which the adjustment section adjusts the projection level for each pixel of the projection section in such a manner that the pixel value of each pixel of the captured image converges on a target value for each pixel.

(6) The information processing apparatus as stated in paragraph (5) above, in which the adjustment section adjusts the projection level for each pixel of the projection section in such a manner that the pixel value converges on a target value for the entire projected image.

(7) The information processing apparatus as stated in any one of paragraphs (4) to (6) above, further including: an initial value setting section configured to set an initial value of the projection level for each pixel of the projection section based on the pixel value of each pixel of the captured image and on a correspondence relation between each pixel of the projection section and each pixel of the imaging section,
in which the adjustment section adjusts the initial value of the projection level set by the initial value setting section for each pixel of the projection section.

(8) The information processing apparatus as stated in paragraph (7) above, further including:
a correspondence relation setting section configured to obtain the correspondence relation between each pixel of the projection section and each pixel of the imaging section based on the projected image and on the captured image,
in which the initial value setting section sets the initial value of the projection level for each pixel of the projection section based on the pixel value of each pixel of the captured image and on the correspondence relation set by the correspondence relation setting section.

(9) The information processing apparatus as stated in paragraph (7) or (8) above, in which the initial value setting section sets the initial value of the projection level for each pixel of the projection section based on depth information and normal line information about the projection plane.

(10) The information processing apparatus as stated in paragraph (9) above, further including:
a depth/normal line information setting section configured to set the depth information and the normal line information, in which the initial value setting section sets the initial value of the projection level for each pixel of the projection section based on the depth information and the normal line information set by the depth/normal line setting section.

(11) The information processing apparatus as stated in any one of paragraphs (7) to (10) above, in which the initial value setting section further sets the initial value of the projection level for each pixel of the projection section based on information about reflectance corresponding to an incidence angle of the projected image relative to the projection plane.

(12) The information processing apparatus as stated in paragraph (11) above, further including:
a reflectance information setting section configured to set information about the reflectance,
in which the initial value setting section sets the initial value of the projection level for each pixel of the projection section based on the information about the reflectance set by the reflectance information setting section.

(13) The information processing apparatus as stated in any one of paragraphs (4) to (12) above, in which the color correction information setting section sets the color correction information for each of multiple projection imaging apparatuses each including the projection section and the imaging section.

(14) The information processing apparatus as stated in paragraph (13) above, in which the adjustment section sets as a target value the smallest of luminance values, observed by an observer, of projected images projected to the projection plane by the projection sections of all projection imaging apparatuses, the adjustment section further adjusting the projection level for each pixel of the projection sections in such a manner that the luminance values converge on the target value.

(15) The information processing apparatus as stated in paragraph (13) or (14) above, in which, if the difference in angle between each of the projection imaging apparatuses on the one hand and the projection plane on the other hand is larger than a predetermined threshold value, the color correction information setting section adjusts the color correction information in accordance with the angle formed between the projection imaging apparatus and the projection plane.

(16) The information processing apparatus as stated in any one of paragraphs (1) to (15) above, further including:
an acquisition section configured to acquire information about the projected image and information about the captured image from a projection imaging apparatus having the projection section and the imaging section,
in which the color correction information setting section sets the color correction information based on the information about the projected image and the information about the captured image acquired by the acquisition section.

(17) The information processing apparatus as stated in any one of paragraphs (1) to (16) above, further including: the projection section and the imaging section.

(18) The information processing apparatus as stated in (17) above, further including:

an acquisition section configured to acquire information about the projected image and information about the captured image from another information processing apparatus having the projection section and the imaging section, in which the color correction information setting section sets the color correction information based on the information about the projected image projected by the projection section of the own information processing apparatus, on the information about the captured image captured by the imaging section of the own information processing apparatus, on the information about the projected image projected by the projection section of the other information processing apparatus and acquired by the acquisition section, and on the information about the captured image captured by the imaging section of the other information processing apparatus and acquired by the acquisition section.

(19) An information processing method including: using a captured image captured by a calibrated imaging section imaging a projected image projected to a projection plane by a calibrated projection section in order to set color correction information as the information for correcting a color of each pixel of the projection section.

(20) A program for causing a computer to function as: a color correction information setting section configured to use a captured image captured by a calibrated imaging section imaging a projected image projected to a projection plane by a calibrated projection section in order to set color correction information as the information for correcting a color of each pixel of the projection section.

REFERENCE SIGNS LIST

101 Projection imaging apparatus
102 Projection plane
111 Projection section
112 Imaging section
121 Projection range
122 Imaging range
131 Sensing pattern
151 Control section
152 Image display section
153 Device control section
154 Image input section
161 Input section
162 Output section
163 Storage section
164 Communication section
165 Drive
300 Projection imaging system
301 Control apparatus
302 Network
351 CPU
352 ROM
353 RAM
354 Bus
360 Input/output interface
361 Input section
362 Output section
363 Storage section
364 Communication section
365 Drive
400 Projection imaging system
410 Projection imaging system
411 Projection imaging apparatus
420 Projection imaging apparatus

The invention claimed is:

1. An information processing apparatus comprising:
a color correction information setting section configured to
use a captured image captured by a calibrated imaging section imaging a projected image projected to a projection plane by a calibrated projection section in order to set color correction information as information for correcting a color of the projection section, and
set the color correction information based on shape information or color information of the projection plane,
wherein the color correction information setting section sets the color correction information for a pixel of the projection section based on the shape information or the color information of a portion of the projection plane to which the pixel belongs, and
wherein the color correction information setting section is implemented via at least one processor.

2. The information processing apparatus according to claim 1, wherein the shape information of the projection plane indicates a flat, curved, or uneven plane, or made up of multiple planes.

3. The information processing apparatus according to claim 1, wherein the color information of at least one color of the projection plane includes any color or colors, or includes any pattern or design of the projection plane.

4. The information processing apparatus according to claim 1, wherein the color correction information setting section further sets the color correction information using environment information of the projection section indicative of an effect on color attributable to the projected image being projected onto the projection plane.

5. The information processing apparatus according to claim 4,
wherein, based on a captured image captured of the projection plane to which the projected image has yet to be projected, the color correction information setting section further obtains an illumination component of the projection plane for the projection section,
wherein the color correction information setting section obtains, from the projected image, a gain amount of the color correction information in white for the projection section, and
wherein the color correction information setting section sets the color correction information using the illumination component, the gain amount, and the environment information for the projection section.

6. The information processing apparatus according to claim 1, wherein the color correction information includes information for correcting a color of each pixel of the projection section.

7. The information processing apparatus according to claim 6, further comprising:
an adjustment section configured to adjust, for each pixel of the projection section, a projection level of the projection section projecting the projected image, based on a pixel value of each pixel of the captured image,
wherein the color correction information setting section sets the color correction information based on the adjusted projection level, and
wherein the adjustment section is implemented via at least one processor.

8. The information processing apparatus according to claim 7, wherein the adjustment section adjusts the projection level for the projection section so that the pixel value of each pixel of the captured image converges on a target value for each pixel.

9. The information processing apparatus according to claim 8, wherein the adjustment section adjusts the projection level for the projection section so that the pixel value converges on a target value for an entirety of the projected image.

10. The information processing apparatus according to claim 7, further comprising:
an initial value setting section configured to set an initial value of the projection level for the projection section based on the pixel value of each pixel of the captured image and on a correspondence relation between each pixel of the projection section and each pixel of the imaging section,
wherein the adjustment section adjusts the initial value of the projection level set by the initial value setting section for each pixel of the projection section, and
wherein the initial value setting section is implemented via at least one processor.

11. The information processing apparatus according to claim 10, further comprising:
a correspondence relation setting section configured to obtain the correspondence relation between each pixel of the projection section and each pixel of the imaging section based on the projected image and on the captured image,
wherein the correspondence relation setting section is implemented via at least one processor.

12. The information processing apparatus according to claim 10,
wherein the initial value setting section sets the initial value of the projection level for each pixel of the projection section based on depth information and normal line information about the projection plane.

13. The information processing apparatus according to claim 12, further comprising:
a depth/normal line information setting section configured to set the depth information and the normal line information,
wherein the initial value setting section sets the initial value of the projection level for each pixel of the projection section based on the depth information and the normal line information set by the depth/normal line information setting section, and
wherein the depth/normal line information setting section is implemented via at least one processor.

14. The information processing apparatus according to claim 12, wherein the color correction information setting section sets the color correction information for each of a plurality of projection imaging apparatuses each including the projection section and the imaging section.

15. The information processing apparatus according to claim 14,
wherein the adjustment section sets as a target value a smallest of luminance values, observed by an observer, of projected images projected to the projection plane by the projection sections of all of the projection imaging apparatuses, and
wherein the adjustment section further adjusts the projection level for the projection sections in such a manner that the luminance values converge on the target value.

16. The information processing apparatus according to claim 14, wherein, when a difference in angle between each of the projection imaging apparatuses and the projection plane is larger than a predetermined threshold value, the color correction information setting section adjusts the color correction information based on an angle formed between a projection imaging apparatus having the projection section and the imaging section, and the projection plane.

17. The information processing apparatus according to claim 10, wherein the initial value setting section further sets the initial value of the projection level for each pixel of the projection section based on information about reflectance corresponding to an incidence angle of the projected image relative to the projection plane.

18. The information processing apparatus according to claim 17, further comprising:
a reflectance information setting section configured to set information about the reflectance,
wherein the reflectance information setting section is implemented via at least one processor.

19. The information processing apparatus according to claim 7,
wherein the color correction information setting section sets the color correction information using the projected image projected by the projection section of which the projection level for each pixel is adjusted by the adjustment section.

20. The information processing apparatus according to claim 1, wherein the color correction information setting section sets the color correction information based on information about the projected image and information about the captured image.

21. The information processing apparatus according to claim 1, further comprising:
the projection section and the imaging section.

22. The information processing apparatus according to claim 21,
wherein another information processing apparatus includes the projection section and the imaging section, and
wherein the color correction information setting section further sets the color correction information based on information about the projected image projected by a projection section of the another information processing apparatus and information about the captured image captured by an imaging section of the another information processing apparatus.

23. The information processing apparatus according to claim 1,
wherein the shape information includes information indicating a shape of the projection plane.

24. The information processing apparatus according to claim 1,
wherein the color information includes information indicating at least one color of the projection plane.

25. An information processing method comprising:
using a captured image captured by a calibrated imaging section imaging a projected image projected to a projection plane by a calibrated projection section in order to set color correction information as information for correcting a color of the projection section; and
setting the color correction information based on shape information or color information of the projection plane,
wherein the color correction information for a pixel of the projection section is set based on the shape information or the color information of a portion of the projection plane to which the pixel belongs.

26. A non-transitory computer-readable medium having embodied thereon a program, which when executed by a computer causes the computer to execute a method, the method comprising:
  using a captured image captured by a calibrated imaging section imaging a projected image projected to a projection plane by a calibrated projection section in order to set color correction information as information for correcting a color of the projection section; and
  setting the color correction information based on shape information or color information of the projection plane,
  wherein the color correction information for a pixel of the projection section is set based on the shape information or the color information of a portion of the projection plane to which the pixel belongs.

* * * * *